Patented Jan. 19, 1932

1,841,420

UNITED STATES PATENT OFFICE

FREDERICK W. SPERR, JR., OF PITTSBURGH, PENNSYLVANIA, ASSIGNOR TO THE KOPPERS COMPANY, A CORPORATION OF DELAWARE

TREATMENT OF VISCOSE SOLUTIONS

No Drawing.   Application filed January 8, 1927.   Serial No. 160,002.

This invention relates to the preparation of viscose solutions and, more particularly, to the preparation of viscose solutions by the common xanthate process.

An object of my invention is to provide a process of converting certain objectionable compounds formed in the preparation of cellulose solutions, into unobjectionable substances.

A second object of my invention is to prevent the liberation of noxious gases during precipitation of cellulose from viscose solutions.

A further object of my invention is to provide a process of producing a lighter colored viscose than is produced by prior processes.

In the preparation of viscose according to that process in which cellulose is dissolved and converted to sodium cellulose xanthate, certain by-products are produced which will decompose when the solution is brought into the presence of an acid, liberating objectionable and noxious gases, such, for instance, as hydrogen sulphide.

I have discovered that these objectionable compounds may be converted into a form not subject to decomposition with evolution of hydrogen sulphide upon acidification, by means of a novel agent and procedure.

In order that my invention may be clearly set forth and understood, I will now describe the preferred manner in which my invention is practiced, including, by way of illustration, the usual method of preparation of viscose solutions.

Cotton linters, chemical wood pulp, or other suitable form of cellulose, is treated with a strong solution of sodium hydroxide, usually of 15 to 20% concentration at a temperature between 15 and 20° C. The excess caustic solution is pressed out and the treated cotton is allowed to age at low temperatures for several days. It is then treated in suitable mixing apparatus with carbon bisulphide, with the resultant formation of sodium cellulose xanthate. During this stage and the subsequent ageing of the sodium cellulose xanthate, sodium sulphide and sodium thiocarbonate are formed in the viscose solution as by-products. If such a solution, after ageing but without further treatment, is spun into or otherwise treated with an acid precipitation bath, hydrogen sulphide is evolved by reaction of the acid with said sodium sulphide and sodium thiocarbonate. This gas, when liberated in the spinning rooms, is most objectionable.

I have found that, when a solution of viscose of proper viscosity for spinning filaments and the like and containing sulphur compounds of the character indicated above is treated with minute quantities of certain catalysts and agitated in a manner effective to induce considerable aeration, or otherwise aerated, preferably for 5 to 7 hours, and at a temparture preferably over 20° C., said sulphur compounds will be converted into a form not subject to decomposition with liberation of hydrogen sulphide upon acidification of the viscose solution, upon being spun into an acid precipitation or mixing bath, or the like.

The compounds which I have found suitable for my purpose are of both organic and inorganic nature. In my copending application, Serial No. 124,556, filed July 24, 1926, I have shown that when a solution containing soluble alkali metal sulphide is aerated in the presence of limited amounts of certain metallic salts, such, for example, as iron oxide, cobalt sulphide or nickel sulphide, said soluble alkali metal sulphide can be converted into a more stable form, i. e. alkali metal thiosulphate. I have also found that aromatic ring compounds containing a plurality of substituted groups, at least one of which is a hydroxyl (OH) group, may be used. While I prefer to use hydroquinone, I may also use other substances falling within the scope of this designation, such as catechol, resorcinol, para-aminophenol, and the like. Such organic compounds are unobjectionable, and ordinarily to be preferred as compared with metallic salts. When using such organic catalysts, I prefer to use form 40 to 60 mg. of the catalyst per liter of viscose solution, although greater or lesser quantities may be required for special conditions.

The results which obtain according to my invention are illustrated by the following example: A solution of viscose containing, when untreated with catalyst but aerated as described above, sufficient quantities of sulphur compounds to liberate 0.17% of hydrogen sulphide, yielded, when treated with 60 mg. per liter of hydroquinone and aerated 6½ hours at a temperature of 25° C., less than 0.04% of hydrogen sulphide (the percentage of hydrogen sulphide is given as by weight of the original viscose solution).

A probable explanation of the above phenomena is that the objectionable sulphur compounds formed in the viscose solution due to side reactions of sodium hydroxide and carbon bisulphide or to decomposition of the xanthate during ageing or during the aeration in the presence of my catalyst are oxidized to compounds such as sodium thiosulphate which are not hydrolyzed or decomposed by acids with liberation of hydrogen sulphide.

According to my invention, liberation of noxious gases during spinning or precipitation of the viscose may be substantially eliminated.

A further advantage gained by the use of these catalysts is that the dark orange, or brown, color of the normal viscose solution is changed to an appreciably lighter color, resulting in the formation of a whiter filament or thread.

My invention is not limited to the specific examples given hereinabove by way of illustration but may be variously embodied and practiced within the scope of the following claims.

I claim as my invention:

1. The process of preventing the liberation of hydrogen sulphide in the precipitation of a viscose solution by an acid which comprises aerating said solution, prior to precipitation thereof, in the presence of a catalyst which promotes the conversion of the objectionable sulphur compounds into other compounds which do not liberate hydrogen sulphide in the presence of an acid.

2. The process of preventing the liberation of hydrogen sulphide in the precipitation of a viscose solution by an acid which comprises aerating said solution, prior to precipitation thereof, in the presence of an aromatic ring compound containing a plurality of substituted groups, at least one of which is a hydroxyl group.

3. The process of treating a viscose solution prior to precipitation thereof which comprises aerating it in the presence of hydroquinone.

4. The process of treating a viscose solution which comprises aerating it at a temperature above 20° C. in the presence of hydroquinone.

5. The process of treating a viscose solution prior to the precipitation thereof which comprises aerating it for over five hours in the presence of hydroquinone.

6. The process of treating a viscose solution prior to precipitation thereof, which comprises aerating it at a temperature of over 20° C. in the presence of from 40 to 60 mg. of hydroquinone per liter of solution.

7. The process of treating a viscose solution containing sodium sulphide and sodium thiocarbonate which comprises aerating the solution in the presence of a catalyst effective to promote the conversion of said sodium sulphide and sodium thiocarbonate into compounds which will not liberate hydrogen sulphide in the presence of acid.

8. The process of treating a solution comprising in part sodium sulphide and sodium thiocarbonate which comprises aerating the solution in the presence of a catalyst effective to promote the conversion of said sodium sulphide and sodium thiocarbonate into compounds which will not liberate hydrogen sulphide in the presence of acid.

9. The process of treating a solution comprising in part sodium thiocarbonate which comprises aerating the solution in the presence of a catalyst effective to promote the conversion of said sodium thiocarbonate into compounds which will not liberate hydrogen sulphide in the presence of acid.

10. The process of treating a viscose solution containing sodium sulphide and sodium thiocarbonate which comprises aerating the solution in the presence of an organic catalyst effective to promote the conversion of said sodium sulphide and sodium thiocarbonate into compounds which will not liberate hydrogen sulphide in the presence of acid.

11. The process of treating a solution comprising in part sodium sulphide and sodium thiocarbonate which comprises aerating the solution in the presence of an organic catalyst effective to promote the conversion of said sodium sulphide and sodium thiocarbonate into compounds which will not liberate hydrogen sulphide in the presence of acid.

12. The process of treating a viscose solution containing sulphur in a form subject to decomposition upon acidification of said solution, resulting in the liberation of hydrogen sulphide, which comprises aerating said solution in the presence of a catalyst to bring said sulphur into a form which will not liberate hydrogen sulphide upon acidification of said solution.

In testimony whereof, I have hereunto subscribed my name this 7th day of January, 1927.

FREDERICK W. SPERR, JR.